(12) United States Patent
Liu

(10) Patent No.: US 11,297,626 B2
(45) Date of Patent: Apr. 5, 2022

(54) INFORMATION INDICATION METHOD AND APPARATUS, BASE STATION AND USER EQUIPMENT

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 8 days.

(21) Appl. No.: 16/962,454

(22) PCT Filed: Jan. 26, 2018

(86) PCT No.: PCT/CN2018/074360
§ 371 (c)(1),
(2) Date: Jul. 15, 2020

(87) PCT Pub. No.: WO2019/144388
PCT Pub. Date: Aug. 1, 2019

(65) Prior Publication Data
US 2021/0076386 A1 Mar. 11, 2021

(51) Int. Cl.
*H04W 72/04* (2009.01)
*H04B 7/06* (2006.01)
(Continued)

(52) U.S. Cl.
CPC ...... *H04W 72/0493* (2013.01); *H04B 7/0617* (2013.01); *H04W 16/28* (2013.01); *H04W 56/001* (2013.01); *H04W 72/005* (2013.01)

(58) Field of Classification Search
CPC .......... H04W 56/001; H04W 56/0015; H04W 72/005; H04W 72/00; H04W 72/02; H04W 72/04; H04B 7/06–0636
See application file for complete search history.

(56) References Cited

U.S. PATENT DOCUMENTS

| 2017/0353254 A1 | 12/2017 | Islam et al. | |
| 2019/0089474 A1* | 3/2019 | Ly | H04W 56/001 |
| 2019/0222340 A1* | 7/2019 | Kaikkonen | H04B 1/7083 |

FOREIGN PATENT DOCUMENTS

| CN | 104980846 A | 10/2015 |
| CN | 106775501 A | 5/2017 |
| WO | WO 2018/016907 A1 | 1/2018 |

OTHER PUBLICATIONS

Discussion on Remaining Minimum System Information, Oct. 9-13, 2017, 3GPP TSG RAN WG1, R1-1717461, pp. 1-15 (Year: 2017).*

(Continued)

*Primary Examiner* — Habte Mered
*Assistant Examiner* — Prince A Mensah
(74) *Attorney, Agent, or Firm* — Finnegan, Henderson, Farabow, Garrett & Dunner, L.L.P.

(57) ABSTRACT

The present disclosure relates to an information indication method and apparatus, a method and an apparatus for determining a CORESET of RMSI, a base station, user equipment and a computer-readable storage medium. The method includes: configuring, for a CORESET of RMSI corresponding to an SSB, indication information indicating that the base station has not transmitted the CORESET of the RMSI in a current transmission cycle of the SSB; adding the indication information to the SSB; and transmitting the SSB carrying the indication information to user equipment UE in a beam scanning manner.

6 Claims, 6 Drawing Sheets

(51) Int. Cl.
H04W 16/28 (2009.01)
H04W 56/00 (2009.01)
H04W 72/00 (2009.01)

(56) References Cited

OTHER PUBLICATIONS

State Intellectual Property Office of the People's Republic of China, Office Action and Search Report Issued in Application No. 201880000072.2, dated Aug. 5, 2020, 29 pages.
ISA State Intellectual Property Office of the People's Republic of China, Written Opinion of the International Searching Authority Issued in Application No. PCT/CN2018/074360, dated Oct. 16, 2018, WIPO, 9 pages.
International Search Report of PCT Application No. PCT/CN2018/074360 from the State Intellectual Property Office of the P.R. China, dated Oct. 16, 2018.
Intel Corporation, *Details on NR PBCH design*, 3GPP TSG RAN WG1 Meeting RAN1 #89, Hangzhou, P.R. China, May 15-19, 2017, pp. 1-8.
Vivo, *Discussion on Remaining Minimum System Information*, 3GPP TSG RAN WG1 Meeting RAN1 #90bis, Prague, Czech Republic, Oct. 9-13, 2017, pp. 1-15.
Vivo, *Remaining aspects on NR-PBCH contents and payload*, 3GPP TSG RAN WG1 Meeting #90bis, Prague, Czech Republic, Oct. 9-13, 2017, pp. 1-7.
State Intellectual Property Office of the People's Republic of China, Office Action and Search Report Issued in Application No. 201880000072.2, dated Mar. 16, 2021, 18 pages.
Vivo, "Discussion on Remaining Minimum System Information", 3GPP TSG RAN WG1 Meeting #90bis, Prague, Czech Republic, R1-1717461, Oct. 9-13, 2017, 15 pages.
Oppo, "Remaining Details of NR PBCH contents", 3GPP TSG RAN WG1 Meeting #91, Reno, USA, R1-1720002, Nov. 27-Dec. 1, 2017, 3 pages.
Qualcomm Incorporated, "Remaining details on NR-PBCH", 3GPP TSG RAN WG1 Meeting 91, Reno, USA, R1-1720648, Nov. 27-Dec. 1, 2017, 4 pages.

\* cited by examiner

INFORMATION INDICATION METHOD AND APPARATUS, BASE STATION AND USER EQUIPMENT

CROSS REFERENCE TO RELATED APPLICATIONS

This application is a national phase application based on International Application No. PCT/CN2018/074360, filed Jan. 26, 2018, the content of which is incorporated herein by reference.

TECHNICAL FIELD

The present disclosure relates to the field of communication technologies, and in particular, to an information indication method and an information indication apparatus, a method and an apparatus for determining a CORESET for RMSI, a base station, user equipment, and a computer-readable storage medium.

BACKGROUND

With the rapid development of wireless communication technology, the fifth generation mobile communication technology (5th Generation, referred to as 5G) has emerged. In the recent discussion of the 3rd Generation Partnership Project (3GPP), the basic architecture of the 5G New Radio (NR) has been established, and the synchronization and broadcast scheme for initial access has also been basically defined. However, when a transmission cycle of a synchronous broadcast block is configured to be 20 ms or shorter, since a transmission cycle of a common control resource set (Control Resource Set, referred to as CORESET) of the remaining critical system information (RMSI) may be longer, such as 40 ms, there may be case where there is no CORESET corresponding to RMSI in a certain 20 ms. However, when standardizing the CORESET search instruction of RMSI, each synchronous broadcast block is configured with a CORESET search window of RMSI within 20 ms. There will be a problem that if the base station performs transmission according to the above configuration, and user equipment (UE) happens to retrieve a 20 ms synchronous broadcast block without CORESET corresponding to RMSI, it is indefinite whether to continue searching at the frequency point or to change to another frequency point, which may affect the access performance.

SUMMARY

In view of the above, the present disclosure provides an information indication method and an information indication apparatus, a method and an apparatus for determining a CORESET of RMSI, a base station, user equipment and a computer-readable storage medium, in which the UE can learn from the indication information that the base station has not transmitted a CORESET of RMSI in a current transmission cycle of the SSB, so that the UE can, when receiving the next SSB, resolve the position of the CORESET of the RMSI from the next SSB. This can improve the search efficiency and improve the access performance of the UE.

According to a first aspect of the examples of the present disclosure, an information indication method is provided, which is applied to a base station. The method includes:

configuring indication information for a common control resource set CORESET of remaining critical system information RMSI corresponding to a synchronous broadcast block SSB, the indication information being used to indicate that the base station has not transmitted a CORESET of the RMSI in a current transmission cycle of the SSB;

adding the indication information to the SSB; and transmitting the SSB carrying the indication information to user equipment UE in a beam scanning manner.

In an example, configuring indication information for a common control resource set CORESET of remaining critical system information RMSI corresponding to a synchronous broadcast block SSB includes:

configuring a time-domain search window of the CORESET of the RMSI into an illegal time-frequency search window.

In an example, configuring indication information for a common control resource set CORESET of remaining critical system information RMSI corresponding to a synchronous broadcast block SSB includes:

configuring the indication information into a redundant code point of frequency offset information between the CORESET of the RMSI corresponding to the SSB and the SSB.

In an example, configuring a time-domain search window of the CORESET of the RMSI into an illegal time-frequency search window includes:

configuring a time-domain starting search position of the CORESET of the RMSI to be a time-domain starting search position of the SSB.

According to a second aspect of the examples of the present disclosure, a method of determining a common control resource set CORESET of remaining critical system information RMSI is provided, which is applied to user equipment UE. The method includes receiving a synchronous broadcast block SSB which carries indication information, and is transmitted by a base station, the indication information being used to indicate that the base station has not transmitted a CORESET of RMSI in a current transmission cycle of the SSB;

resolving the indication information from the SSB;

in case that it is determined that the base station has not transmitted a CORESET of RMSI in a current transmission cycle of the SSB based on the indication information, resolving a position of the CORESET of the RMSI from a next SSB when the next SSB is received; and in case that the position of the CORESET of the RMSI is not obtained, repeatedly performing the operation of resolving the position of the CORESET of the RMSI from a next SSB when the next SSB is received, until the CORESET of the RMSI is obtained.

According to a third aspect of the examples of the present disclosure, an information indicating apparatus is provided, which is applied to a base station. The apparatus includes:

a configuration module configured to configure indication information for a common control resource set CORESET of remaining critical system information RMSI corresponding to a synchronous broadcast block SSB, the indication information being used to indicate that the base station has not transmitted a CORESET of RMSI in a current transmission cycle of the SSB;

an addition module configured to add the indication information to the SSB, the indication information being configured by the configuration module for the common control resource set CORESET of the remaining critical system information RMSI corresponding to the synchronous broadcast block SSB; and a transmission module configured to transmit the SSB carrying the indication information added by the addition module, to user equipment UE in a beam scanning manner.

In an example, the configuration module includes:

a first configuration submodule configured to configure a time-domain search window of the CORESET of the RMSI into an illegal time-frequency search window.

In an example, the configuration module includes:

a second configuration submodule configured to configure the indication information into a redundant code point of frequency offset information between the CORESET of the RMSI corresponding to the SSB and the SSB.

In an example, the first configuration submodule includes:

a configuration unit configured to configure a time-domain starting search position of the CORESET of the RMSI to be a time-domain starting search position of the SSB.

According to a fourth aspect of the examples of the present disclosure, an apparatus for determining a common control resource set CORESET of remaining critical system information RMSI is provided, which is applied to user equipment UE. The apparatus includes:

a receiving module configured to receive a synchronous broadcast block SSB which carries indication information, and is transmitted by a base station, the indication information being used to indicate that the base station has not transmitted a CORESET of RMSI in a current transmission cycle of the SSB;

a resolving module configured to resolve the indication information from the SSB received by the receiving module;

a determining module configured to, in case that it is determined that the base station has not transmitted a CORESET of RMSI in a current transmission cycle of the SSB based on the indication information resolved by the resolving module, resolve a position of the CORESET of the RMSI from a next SSB when the next SSB is received; and in case that the position of the CORESET of the RMSI is not obtained, repeatedly perform the operation of resolving the position of the CORESET of the RMSI from a next SSB when the next SSB is received until the CORESET of the RMSI is obtained.

According to a fifth aspect of the examples of the present disclosure, a base station is provided, including:

a processor; and a memory for storing processor executable instructions;

wherein the processor is configured to:

configure indication information for a common control resource set CORESET of remaining critical system information RMSI corresponding to a synchronous broadcast block SSB, the indication information being used to indicate that the base station has not transmitted a CORESET of RMSI in a current transmission cycle of the SSB;

add the indication information to the SSB; and transmit the SSB carrying the indication information to user equipment UE in a beam scanning manner.

According to a sixth aspect of the examples of the present disclosure, user equipment is provided, including:

a processor; and a memory for storing processor executable instructions wherein the processor is configured to:

receive a synchronous broadcast block SSB which carries indication information, and is transmitted by a base station, the indication information being used to indicate that the base station has not transmitted a CORESET of RMSI in a current transmission cycle of the SSB;

resolve the indication information from the SSB;

in case that it is determined that the base station has not transmitted a CORESET of RMSI in a current transmission cycle of the SSB based on the indication information, resolve a position of the CORESET of the RMSI from a next SSB when the next SSB is received; and in case that the position of the CORESET of the RMSI is not obtained, repeatedly perform the operation of resolving the position of the CORESET of the RMSI from a next SSB when the next SSB is received until the CORESET of the RMSI is obtained.

According to a seventh aspect of the examples of the present disclosure, a computer-readable storage medium is provided, the computer-readable storage medium having computer instructions stored thereon, when the instructions are executed by a processor, the steps of the information indication method described above are implemented.

According to an eighth aspect of the examples of the present disclosure, a computer-readable storage medium is provided, the computer-readable storage medium having computer instructions stored thereon, when the instructions are executed by a processor, the steps of the method of determining a common control resource set CORESET of remaining critical system information RMSI described above are implemented.

The technical solutions provided by the embodiments of the present disclosure can include the following beneficial effects.

By configuring indication information for a CORESET of RMSI corresponding to an SSB, the indication information indicating that the base station has not transmitted a CORESET of RMSI in a current transmission cycle of the SSB, and transmitting the SSB carrying the indication information to the UE in a beam scanning manner, the UE can learn from the indication information that the base station has not transmitted a CORESET of RMSI in a current transmission cycle of the SSB, so that the UE can, when receiving the next SSB, resolve the position of the CORESET of the RMSI from the next SSB. This can improve the search efficiency and improve the access performance of the UE.

By receiving the SSB which carries the indication information, and is transmitted by the base station, and resolving the indication information from the SSB, if it is learned from the indication information that the base station has not transmitted the CORESET of the RMSI within the current transmission cycle of the SSB, then when the next SSB is received, the position of CORESET of the RMSI is resolved from the next SSB. The search efficiency can be improved, and the access performance of the UE can be improved.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
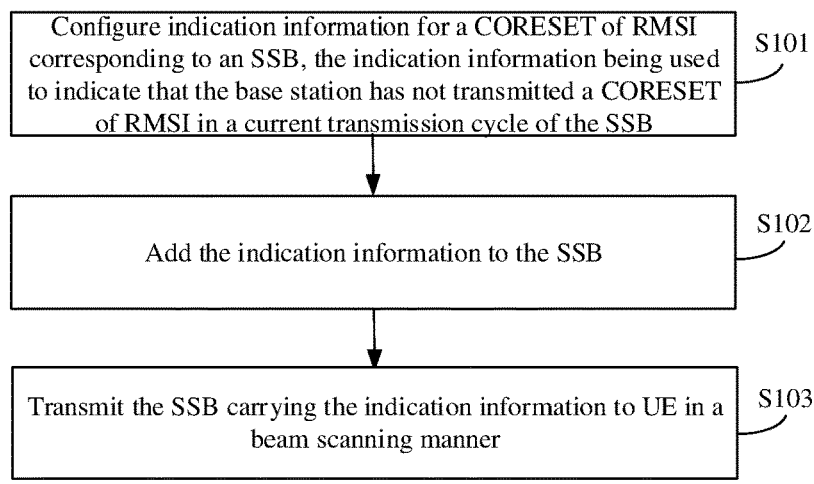
FIG. 1 is a flowchart illustrating an information indication method according to an example of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

FIG. 1 is a flowchart illustrating an information indication method according to an example of the present disclosure. The example will be described from the perspective of a base station. As shown FIG. 1, the information indication method includes blocks S101-S103.

At block S101, indication information for a CORESET of RMSI corresponding to a synchronous broadcast block (SSB) is configured, the indication information being used to indicate that the base station has not transmitted a CORESET of RMSI in a current transmission cycle of the SSB.

The SSB refers to a synchronization signal block or a physical broadcast channel block. The current transmission cycle of the SSB can be 5 milliseconds (ms) or 20 ms. The transmission cycle of the CORESET of the RMSI is at least twice the current transmission cycle of the SSB.

The indication information for the CORESET of the RMSI corresponding to the SSB can be configured through two implementations.

Implementation 1). A time-domain search window of the CORESET of the RMSI is configured into an illegal time-frequency search window.

The illegal time-frequency search window refers to a window to which the time-domain search window of the CORESET of the RMSI cannot be configured, as stipulated by the existing protocol.

For example, a time-domain starting search position of the CORESET of the RMSI can be configured as a time-domain starting search position of the SSB. Since the existing protocol stipulates that the time-domain starting search position of the CORESET of the RMSI cannot be configured as the time-domain starting search position of the SSB, the time-domain starting search position of the CORESET of the RMSI is an illegal position.

Implementation 2). The indication information is configured to a redundant code point of frequency offset information between the CORESET of the RMSI corresponding to the SSB and the SSB.

At present, when representing the frequency offset information between the CORESET of the RMSI and the SSB, there are several reserved bits, that is, redundant code points, and the indication information can be configured into one of the redundant code points.

At block S102, the indication information is added to the SSB.

After configuring the indication information, the base station adds the indication information to the SSB.

At block S103, the SSB carrying the indication information is transmitted to the UE in a beam scanning manner.

After adding the indication information to the SSB, the base station can transmit the SSB carrying the indication information to the UE in a beam scanning manner. After receiving the SSB, the UE can resolve the indication information from the SSB. If it is determined based on the indication information that the base station has not transmitted a CORESET of RMSI in a current transmission cycle of the SSB, the UE can, when receiving the next SSB, resolve the position of the CORESET of the RMSI from the next SSB, and if the UE does not obtain the position of the CORESET of the RMSI, the above operation is repeatedly performed until the CORESET of the RMSI is obtained.

In the above example, by configuring indication information for a CORESET of RMSI corresponding to an SSB, the indication information indicating that the base station has not transmitted a CORESET of RMSI in a current transmission cycle of the SSB, and transmitting the SSB carrying the indication information to the UE in a beam scanning manner, the UE can learn from the indication information that the base station has not transmitted a CORESET of RMSI in the current transmission cycle of the SSB, so that the UE can, when receiving the next SSB, resolve the position of the CORESET of the RMSI from the next SSB. This can improve the search efficiency and improve the access performance of the UE.

Figure 2:
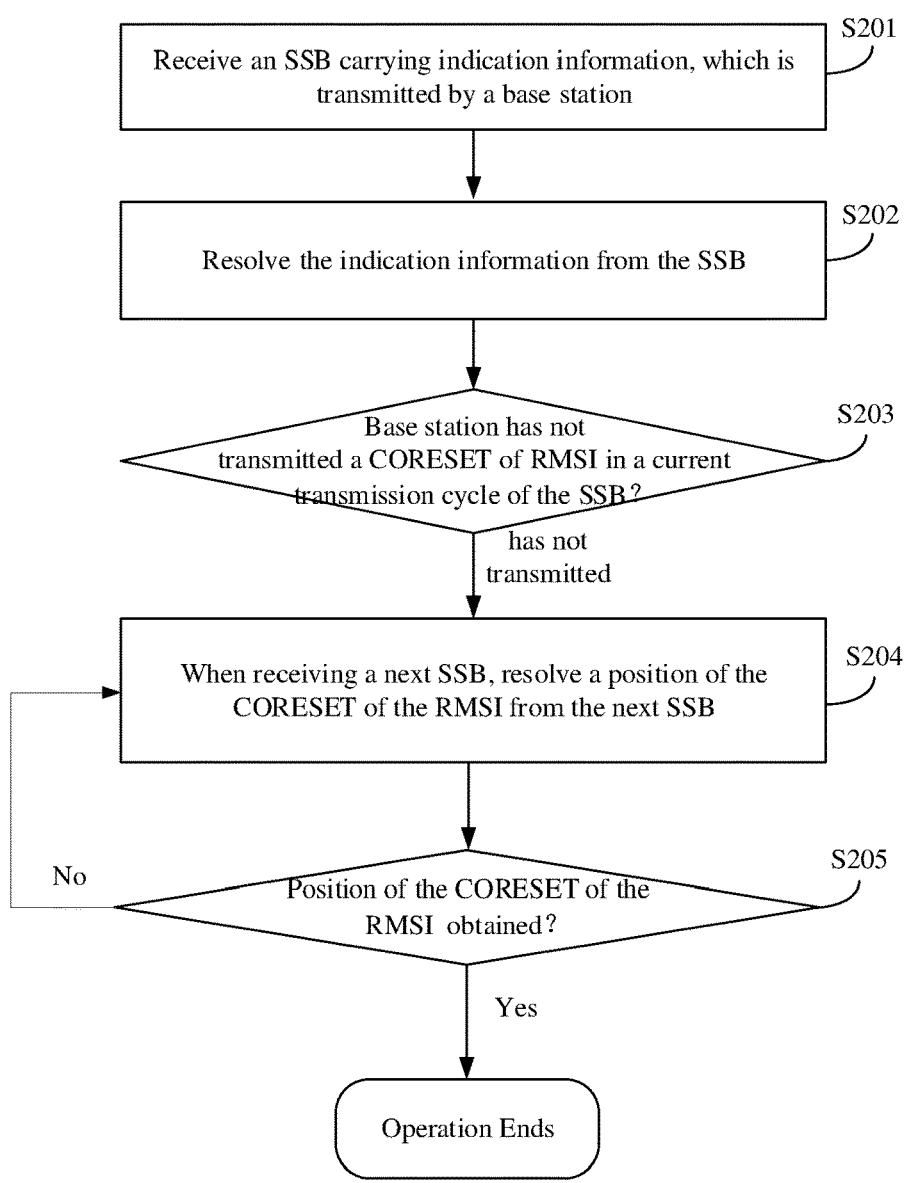
FIG. 2 is a flowchart illustrating a method of determining a CORESET of RMSI according to an example of the present disclosure.

FIG. 2 is a flowchart illustrating a method of determining a CORESET of RMSI according to an example of the present disclosure. This example is described from the perspective of the UE side. As shown in FIG. 2, the method of determining CORESET of an RMSI includes blocks S201-S205.

At block S201, an SSB carrying indication information, which is transmitted by a base station, is received, the indication information being used to indicate that the base station has not transmitted a CORESET of RMSI in a current transmission cycle of the SSB.

The SSB refers to a synchronization signal block or a physical broadcast channel block.

At block S202, the indication information is resolved from the SSB.

At block S203, based on the indication information, it is determined whether the base station has transmitted a CORESET of RMSI in a current transmission cycle of the SSB. If it is determined based on the indication information that the base station has not transmitted a CORESET of RMSI in a current transmission cycle of the SSB, then the block S204 is performed.

At block S204, when the next SSB is received, the position of the CORESET of the RMSI is resolved from the next SSB.

At block S205, it is determined whether the position of the CORESET of the RMSI is obtained. If the position of the CORESET of the RMSI is not obtained, block S204 is repeatedly performed. If the position of the CORESET of the RMSI is obtained, the operation ends.

In this example, after receiving the SSB carrying the indication information, which is transmitted by the base station, the UE can resolve the indication information from the SSB, and if it is determined based on the indication information that the base station has not transmitted the COSI of the RMSI within the current transmission cycle of the SSB. When the next SSB is received, the position of the CORESET of the RMSI is resolved from the next SSB. If the position of the CORESET of the RMSI is obtained, the operation ends. If the position of the CORESET of the RMSI is not obtained, the above operation is repeated until the CORESET of RMSI is obtained.

In the above example, by receiving the SSB carrying the indication information, which is transmitted by the base station, and resolving the indication information from the SSB, if it is learned from the indication information that the base station has not transmitted the CORESET of the RMSI within the current transmission cycle of the SSB, then when the next SSB is received, the position of CORESET of the RMSI is resolved from the next SSB. The search efficiency can be improved, and the access performance of the UE can be improved.

Figure 3:
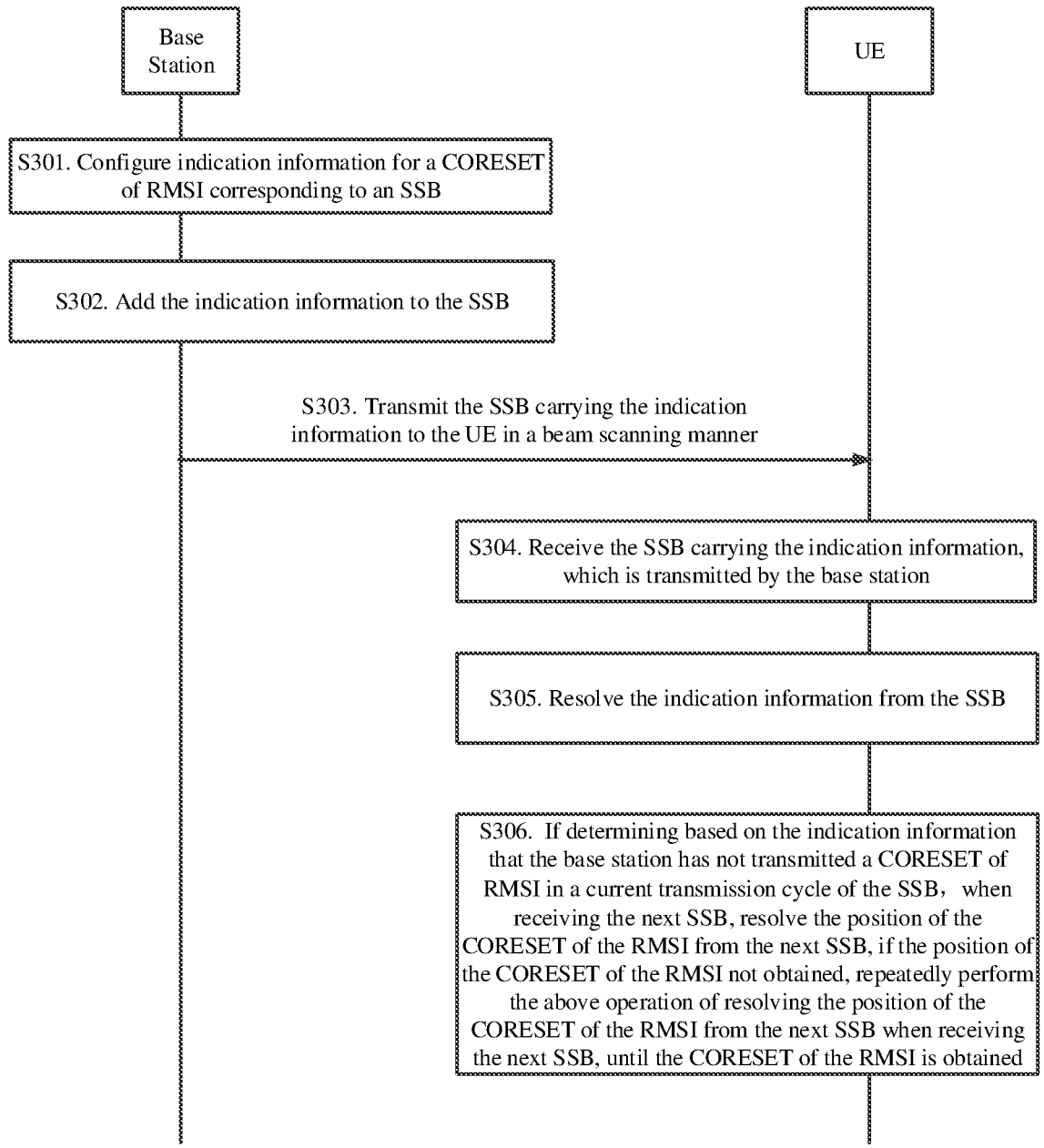
FIG. 3 is a signaling flowchart illustrating a method of determining a CORESET of RMSI according to an example of the present disclosure.

FIG. 3 is a signaling flowchart illustrating a method of determining a CORESET of RMSI according to an example of the present disclosure. This example is described from the perspective of interaction between a base station and a UE. As shown in FIG. 3, the method of determining a CORESET of RMSI includes blocks S301-S306.

At block S301, the base station configures indication information for a CORESET of RMSI corresponding to an SSB, the indication information being used to indicate that the base station has not transmitted a CORESET of RMSI in a current transmission cycle of the SSB.

At block S302, the base station adds the indication information to the SSB.

At block S303, the base station transmits the SSB carrying the indication information to the UE in a beam scanning manner.

At block S304, the UE receives the SSB carrying the indication information, which is transmitted by the base station.

At block S305, the UE resolves the indication information from the SSB.

At block S306, if the UE determines based on the indication information that the base station has not transmitted a CORESET of RMSI in a current transmission cycle of the SSB, the UE can, when receiving the next SSB, resolve the position of the CORESET of the RMSI from the next SSB, and if the UE does not obtain the position of the CORESET of the RMSI, repeatedly perform the above operation of resolving the position of the CORESET of the RMSI from the next SSB when receiving the next SSB, until the CORESET of the RMSI is obtained.

In the above example, through the interaction between the base station and the UE, the UE can determine based on the indication information that the base station has not transmitted the COSRESET of the RMSI within the current transmission cycle of the SSB, so that when the next SSB is received, the UE resolves the position of the CORESET of the RMSI from the next SSB. It can improve the search efficiency and improve the access performance of the UE.

Figure 4:
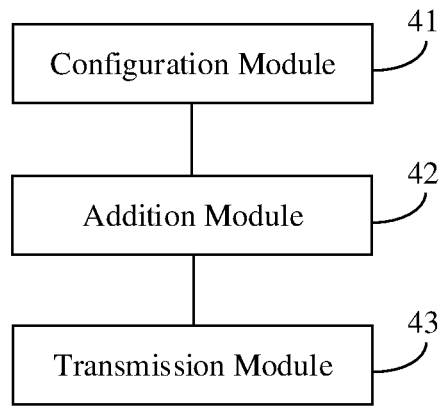
FIG. 4 is a block diagram illustrating an information indication apparatus according to an example of the present disclosure.

FIG. 4 is a block diagram illustrating an information indication apparatus according to an example of the present disclosure. The apparatus is applied in a base station. As shown in FIG. 4, the apparatus includes a configuration module 41, an addition module 42 and a transmission module 43.

The configuration module 41 is configured to configure indication information for a common control resource set CORESET of remaining critical system information RMSI corresponding to a synchronous broadcast block SSB, the indication information being used to indicate that the base station has not transmitted a CORESET of RMSI in a current transmission cycle of the SSB.

The SSB refers to a synchronization signal block or a physical broadcast channel block. The current transmission cycle of the SSB can be 5 milliseconds (ms) or 20 ms. The transmission cycle of the CORESET of the RMSI is at least twice the current transmission cycle of the SSB.

The addition module 42 is configured to add the indication information to the SSB, the indication information being configured by the configuration module 41 for the common control resource set CORESET of the remaining critical system information RMSI corresponding to the synchronous broadcast block SSB.

After the indication information is configured, the indication information is added to the SSB.

The transmission module 43 is configured to transmit the SSB carrying the indication information added by the addition module 42, to user equipment UE in a beam scanning manner.

After adding the indication information to the SSB, the base station can transmit the SSB carrying the indication information to the UE in a beam scanning manner. After receiving the SSB, the UE can resolve the indication information from the SSB. If it is determined based on the indication information that the base station has not transmitted a CORESET of RMSI in a current transmission cycle of the SSB, the UE can, when receiving the next SSB, resolve the position of the CORESET of the RMSI from the next SSB, and if the UE does not obtain the position of the CORESET of the RMSI, the above operation is repeatedly performed until the CORESET of the RMSI is obtained.

In the above example, by configuring indication information for a CORESET of RMSI corresponding to an SSB, the indication information indicating that the base station has not transmitted a CORESET of RMSI in a current transmission cycle of the SSB, and transmitting the SSB carrying the indication information to the UE in a beam scanning manner, the UE can learn from the indication information that the base station has not transmitted a CORESET of RMSI in a current transmission cycle of the SSB, so that the UE can, when receiving the next SSB, resolve the position of the CORESET of the RMSI from the next SSB. This can improve the search efficiency and improve the access performance of the UE.

Figure 5:
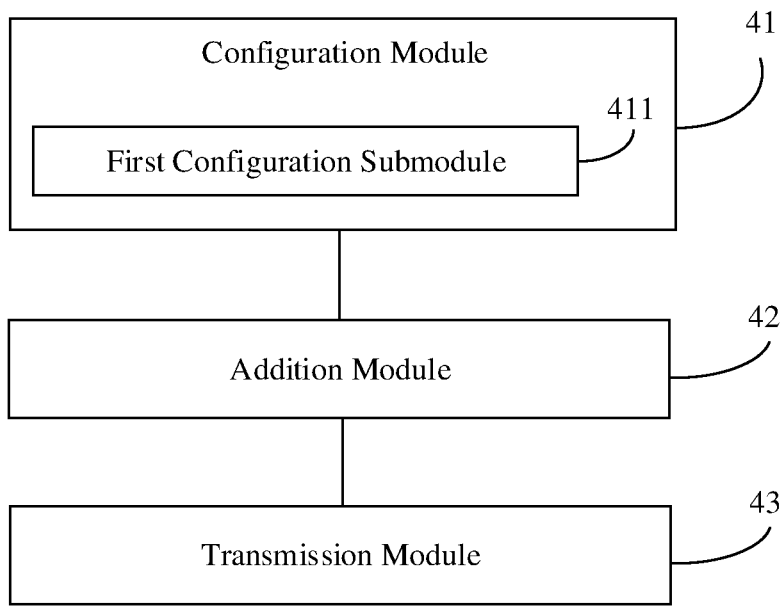
FIG. 5 is a block diagram illustrating another information indication apparatus according to an example.

FIG. 5 is a block diagram illustrating another information indication apparatus according to an example. As shown in FIG. 5, based on the example shown in FIG. 4, the configuration module 41 can include a first configuration submodule 411.

The first configuration submodule 411 is configured to configure a time-domain search window of the CORESET of the RMSI into an illegal time-frequency search window.

The illegal time-frequency search window refers to a window to which the time-domain search window of the CORESET of the RMSI cannot be configured, as stipulated by the existing protocol.

In the above example, by configuring a time-domain search window of the CORESET of the RMSI into an illegal time-frequency search window, it can implement configuring indication information for a common control resource set CORESET of remaining critical system information RMSI corresponding to an SSB. The implementation is flexible.

Figure 6:
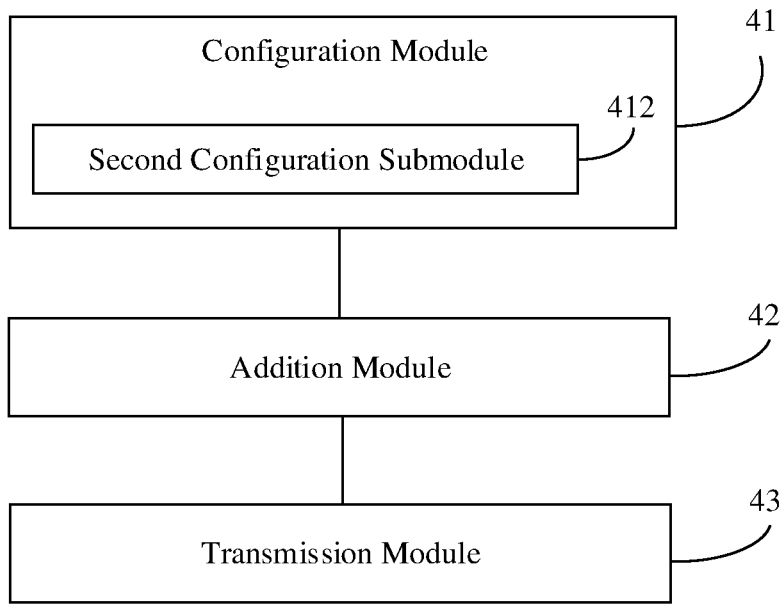
FIG. 6 is a block diagram illustrating another information indication apparatus according to an example.

FIG. 6 is a block diagram illustrating another information indication apparatus according to an example. As shown in FIG. 6, based on the example shown in FIG. 4, the configuration module 41 can include a second configuration submodule 412.

The second configuration submodule 412 is configured to configure the indication information into a redundant code point of frequency offset information between the CORESET of the RMSI corresponding to the SSB and the SSB.

At present, when representing the frequency offset information between the CORESET of the RMSI and the SSB, there are several reserved bits, that is, redundant code points, and indication information can be configured into one of the redundant code points.

In the above example, by configuring the indication information into a redundant code point of frequency offset information between the CORESET of the RMSI corresponding to the SSB and the SSB, it can implement configuring indication information for a common control resource set CORESET of remaining critical system information RMSI corresponding to an SSB. The implementation is flexible.

Figure 7:
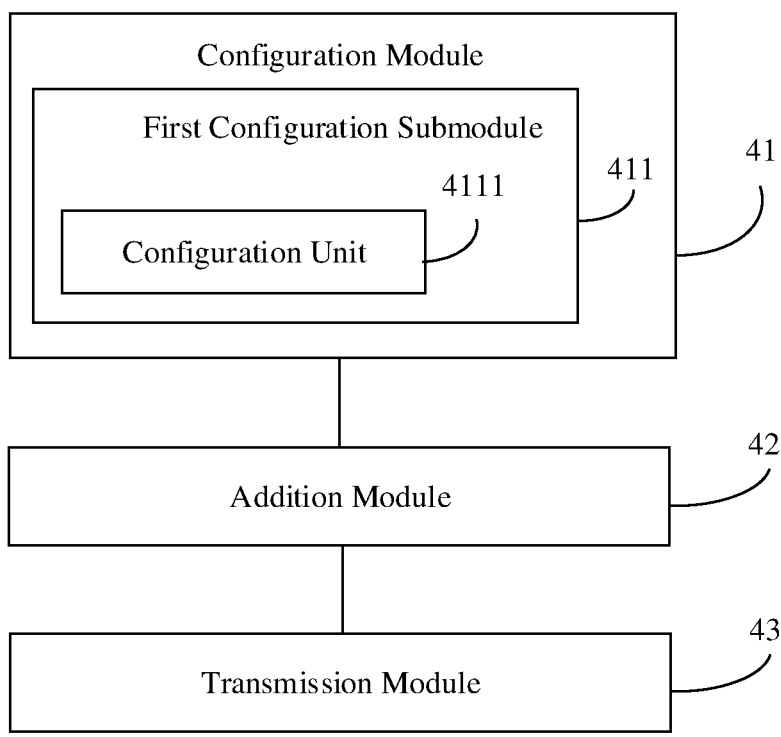
FIG. 7 is a block diagram illustrating another information indication apparatus according to an example.

FIG. 7 is a block diagram illustrating another information indication apparatus according to an example. As shown in FIG. 7, based on the example shown in FIG. 5, the first configuration submodule 411 can include a configuration unit 4111.

The configuration unit 4111 is configured to configure a time-domain starting search position of the CORESET of the RMSI to be a time-domain starting search position of the SSB.

For example, a time-domain starting search position of the CORESET of the RMSI can be configured as a time-domain starting search position of the SSB. Since the existing protocol stipulates that the time-domain starting search position of the CORESET of the RMSI cannot be configured as the time-domain starting search position of the SSB, the time-domain starting search position of the CORESET of the RMSI is an illegal position.

In the above example, by configuring a time-domain starting search position of the CORESET of the RMSI to be a time-domain starting search position of the SSB, it can implement configuring a time-domain search window of the CORESET of the RMSI into an illegal time-frequency search window. The implementation is simple.

Figure 8:
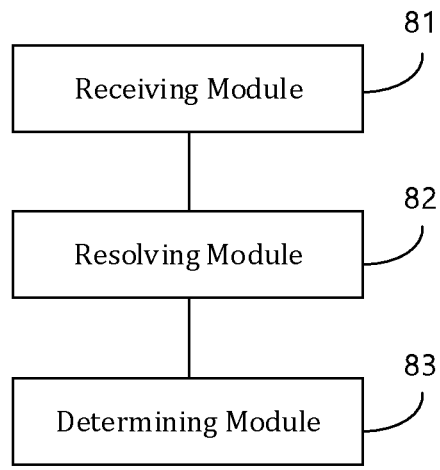
FIG. 8 is a block diagram illustrating an apparatus for determining a CORESET of RMSI according to an example.

FIG. 8 is a block diagram illustrating an apparatus for determining a CORESET of RMSI according to an example. The apparatus is applied to a UE. As shown in FIG. 8, the apparatus includes a receiving module 81, a resolving module 82 and a determining module 83.

The receiving module 81 is configured to receive a synchronous broadcast block SSB carrying indication information, which is transmitted by a base station, the indication information being used to indicate that the base station has not transmitted a CORESET of RMSI in a current transmission cycle of the SSB.

The SSB refers to a synchronization signal block or a physical broadcast channel block The resolving module 82 is configured to resolve the indication information from the SSB received by the receiving module.

The determining module 83 is configured to, if based on the indication information resolved by the resolving module 82, determining that the base station has not transmitted a CORESET of RMSI in a current transmission cycle of the SSB, when receiving a next SSB, resolve a position of the CORESET of the RMSI from the next SSB; if the position of the CORESET of the RMSI is not obtained, repeatedly perform the operation of when receiving a next SSB, resolving the position of the CORESET of the RMSI from the next SSB until the CORESET of the RMSI is obtained.

In this example, after receiving the SSB carrying the indication information, which is transmitted by the base station, the UE can resolve the indication information from the SSB. If it is determined based on the indication information that the base station has not transmitted the COSI of the RMSI within the current transmission cycle of the SSB, when the next SSB is received, the position of the CORESET of the RMSI is resolved from the next SSB. If the position of the CORESET of the RMSI is obtained, the operation ends. If the position of the CORESET of the RMSI is not obtained, the above operation is repeated until the CORESET of RMSI is obtained.

In the above example, by receiving the SSB carrying the indication information, which is transmitted by the base station, and resolving the indication information from the SSB, if it is learned from the indication information that the base station has not transmitted the CORESET of the RMSI within the current transmission cycle of the SSB, then when the next SSB is received, the position of CORESET of the RMSI is resolved from the next SSB. The search efficiency can be improved, and the access performance of the UE can be improved.

Figure 9:
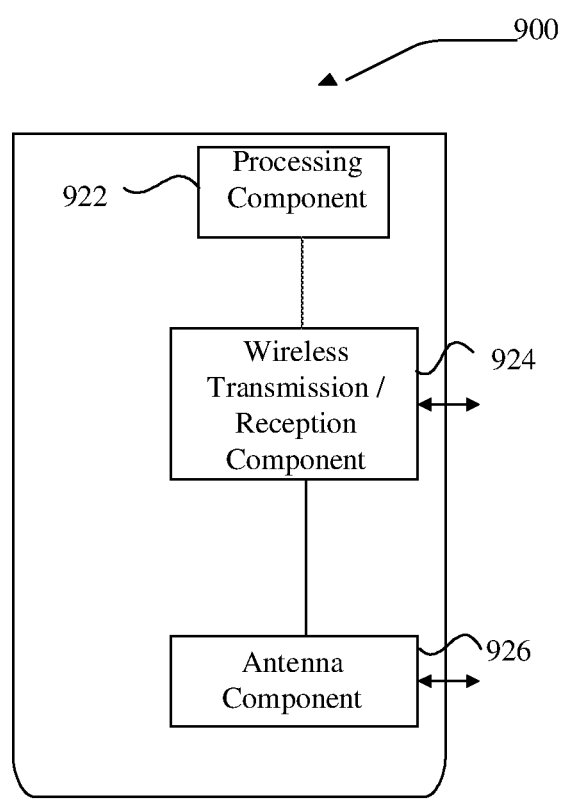
FIG. 9 is a block diagram illustrating an information indication apparatus according to an example.

FIG. 9 is a block diagram illustrating an information indication apparatus according to an example. The apparatus 900 can be a base station. Referring to FIG. 9, the apparatus 900 includes a processing component 922, a wireless transmission/reception component 924, an antenna component 926, and a signal processing part unique to the wireless interface. The processing component 922 may further include one or more processors.

One processor of the processing component 922 can be configured to:

configure indication information for a common control resource set CORESET of remaining critical system information RMSI corresponding to a synchronous broadcast block SSB, the indication information being used to indicate that the base station has not transmitted a CORESET of RMSI in a current transmission cycle of the SSB;

add the indication information to the SSB; and transmit the SSB carrying the indication information to user equipment UE in a beam scanning manner.

In an example, a non-transitory computer-readable storage medium including instructions is provided, the instructions can be executed by the processing component 922 of the apparatus 900 to complete the information indication method. For example, the non-transitory computer-readable storage medium can be a ROM, a random access memory (RAM), a CD-ROM, a magnetic tape, a floppy disk, an optical data storage device, or the like.

Figure 10:
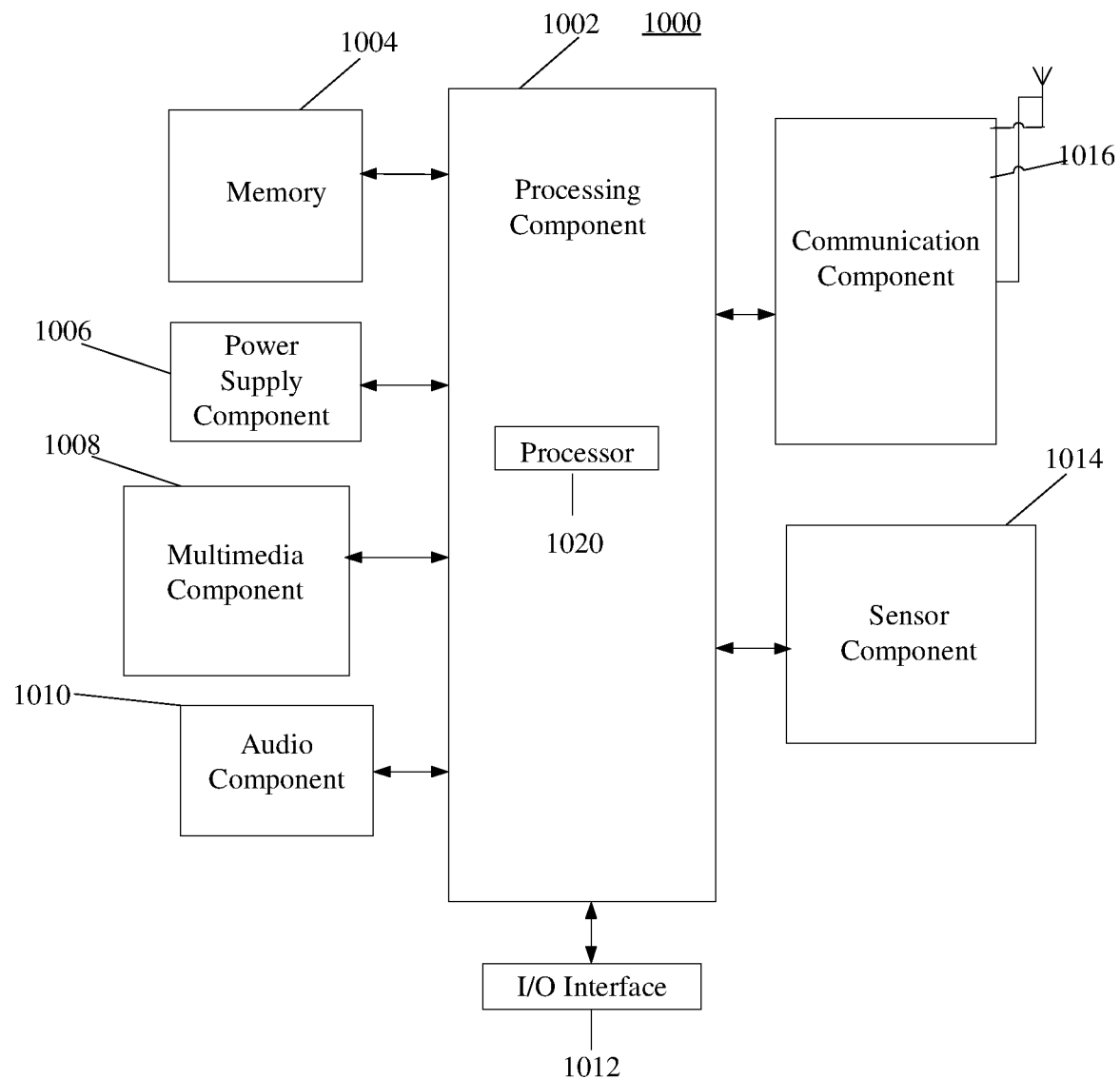
FIG. 10 is a block diagram illustrating an apparatus for determining a CORESET of RMSI according to an example.

FIG. 10 is a block diagram illustrating an information indication apparatus according to an example. For example, the apparatus 1000 can be user equipment such as a mobile phone, a computer, a digital broadcasting terminal, a messaging device, a game console, a tablet device, a medical device, fitness equipment, a personal digital assistant, or the like.

As shown in FIG. 10, the apparatus 1000 can include one or more of the following components: a processing component 1002, a memory 1004, a power supply component 1006, a multimedia component 1008, an audio component 1010, an input/output (I/O) interface 1012, a sensor component 1014, and a communication component 1016.

The processing component 1002 generally controls overall operations of the apparatus 1000, such as operations associated with display, phone calls, data communications, camera operations, and recording operations. The processing component 1002 can include one or more processors 1020 to execute instructions to complete all or part of the blocks of the above methods. In addition, the processing component 1002 can include one or more modules which facilitate the interaction between the processing component 1002 and other components. For example, the processing component 1002 can include a multimedia module to facilitate the interaction between the multimedia component 1008 and the processing component 1002.

One processor in the processing component 1022 can be configured to:

receive a synchronous broadcast block SSB carrying indication information, which is transmitted by a base station, the indication information being used to indicate that the base station has not transmitted a CORESET of RMSI in a current transmission cycle of the SSB;

resolve the indication information from the SSB;

if based on the indication information, determining that the base station has not transmitted a CORESET of RMSI in a current transmission cycle of the SSB, when receiving a next SSB, resolve a position of the CORESET of the RMSI from the next SSB; and if the position of the CORESET of the RMSI is not obtained, repeatedly perform the operation of when receiving a next SSB, resolving the position of the CORESET of the RMSI from the next SSB until the CORESET of the RMSI is obtained.

The memory 1004 is configured to store various types of data to support the operation of the apparatus 1000. Examples of such data include instructions for any application or method operated on the apparatus 1000, contact data, phonebook data, messages, pictures, videos, and so on. The memory 1004 can be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 1006 supplies power for different components of the apparatus 1000. The power supply component 1006 can include a power supply management system, one or more power supplies, and other components associated with generating, managing and distributing power for the apparatus 1000.

The multimedia component 1008 includes a screen providing an output interface between the apparatus 1000 and a user. In some examples, the screen can include a Liquid Crystal Display (LCD) and a Touch Panel (TP). If the screen includes the TP, the screen can be implemented as a touch screen to receive input signals from the user. The TP can include one or more touch sensors to sense touches, swipes, and gestures on the TP. The touch sensors can not only sense a boundary of a touch or swipe, but also sense a duration and a pressure associated with the touch or swipe. In some examples, the multimedia component 1008 can include a front camera and/or a rear camera. The front camera and/or rear camera can receive external multimedia data when the apparatus 1000 is in an operating mode, such as a photographing mode or a video mode. Each of the front camera and the rear camera can be a fixed optical lens system or have focal length and optical zooming capability.

The audio component 1010 is configured to output and/or input an audio signal. For example, the audio component 1010 includes a microphone (MIC). When the apparatus 1000 is in an operating mode, such as a call mode, a record mode and a voice recognition mode, the microphone is configured to receive an external audio signal. The received audio signal can be further stored in the memory 1004 or sent via the communication component 1016. In some examples, the audio component 1010 further includes a speaker for outputting an audio signal.

The I/O interface 1012 provides an interface between the processing component 1002 and a peripheral interface module. The above peripheral interface module can be a keyboard, a click wheel, buttons, or the like. These buttons can include but not limited to, a home button, a volume button, a start button and a lock button.

The sensor component 1014 includes one or more sensors to provide status assessments of various aspects for the apparatus 1000. For example, the sensor component 1014 can detect the on/off status of the apparatus 1000, and relative positioning of component, for example, the component is a display and a keypad of the apparatus 1000. The sensor component 1014 can also detect a change in position of the apparatus 1000 or a component of the apparatus 1000, a presence or absence of the contact between a user and the apparatus 1000, an orientation or an acceleration/deceleration of the apparatus 1000, and a change in temperature of the apparatus 1000. The sensor component 1014 can include a proximity sensor configured to detect the presence of a nearby object without any physical contact. The sensor component 1014 can further include an optical sensor, such as a Complementary Metal-Oxide-Semiconductor (CMOS) or Charged Coupled Device (CCD) image sensor which is used in imaging applications. In some examples, the sensor component 1014 can further include an acceleration sensor, a gyroscope sensor, a magnetic sensor, a pressure sensor, or a temperature sensor.

The communication component 1016 is configured to facilitate wired or wireless communication between the apparatus 1000 and other devices. The apparatus 1000 can access a wireless network based on a communication standard, such as Wi-Fi, 2G or 3G, or a combination thereof. In an example, the communication component 1016 receives a broadcast signal or broadcast related information from an external broadcast management system via a broadcast channel In an example, the communication component 1016 can further include a Near Field Communication (NFC) module for promoting short-range communication. For example, the NFC module can be implemented based on a radio frequency identification (RFID) technology, an infrared data association (IrDA) technology, an ultra-wideband (UWB) technology, a Bluetooth® (BT) technology and other technologies.

In an example, the apparatus 1000 can be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an example, a non-transitory computer readable storage medium including instructions is further provided, such as the memory 1004 including instructions. The above instructions can be executed by the processor 1020 of the apparatus 1000 to complete the above method. For example, the non-transitory computer readable storage medium can be a Read-Only Memory (ROM), a Random Access Memory (RAM), a CD-ROM, a magnetic tape, a floppy disk, an optical data storage device, and so on.

Since the apparatus examples substantially correspond to the method examples, a reference can be made to part of the descriptions of the method examples for the related part. The apparatus examples described above are merely illustrative, where the units described as separate members can be or not be physically separated, and the members displayed as units can be or not be physical units, i.e., can be located in one place, or can be distributed to a plurality of network units. Part or all of the modules can be selected based on actual requirements to implement the objectives of the solutions in the examples. Those of ordinary skill in the art can understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the element.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes can be made without departing from the scope thereof. The scope of the present disclosure is limited only by the appended claims.

The invention claimed is:

1. An information indication method, applied to a base station, the method comprising:
configuring indication information for a common control resource set (CORESET) of remaining critical system information (RMSI) corresponding to a synchronous broadcast block (SSB), the indication information being configured to indicate that the base station has not transmitted a CORESET of the RMSI in a current transmission cycle of the SSB;
adding the indication information to the SSB; and
transmitting the SSB carrying the indication information to user equipment (UE) in a beam scanning manner;
wherein configuring the indication information for the CORESET of the RMSI corresponding to the SSB comprises at least one of:
configuring a time-domain search window of the CORESET of the RMSI into an illegal time-frequency search window; or
configuring the indication information into a redundant code point of frequency offset information between the CORESET of the RMSI corresponding to the SSB and the SSB.

2. The method according to claim 1, wherein configuring the indication information for the CORESET of the RMSI corresponding to the SSB comprises configuring the time-domain search window of the CORESET of the RMSI to the illegal time-frequency search window, and configuring the time-domain search window comprises:
configuring a time-domain starting search position of the CORESET of the RMSI to be a time-domain starting search position of the SSB.

3. A method of determining a common control resource set (CORESET) of remaining critical system information (RMSI), applied to user equipment (UE), the method comprising:
receiving a synchronous broadcast block (SSB) which carries indication information and is transmitted by a base station, the indication information being configured to indicate that the base station has not transmitted a CORESET of the RMSI in a current transmission cycle of the SSB;
resolving the indication information from the SSB; and
in case that it is determined that the base station has not transmitted the CORESET of the RMSI in the current transmission cycle of the SSB based on the indication information, resolving a position of the CORESET of the RMSI from a next SSB when the next SSB is received; and in case that the position of the CORESET of the RMSI is not obtained, repeatedly performing the resolving the position of the CORESET of the RMSI from the next SSB when the next SSB is received, until the CORESET of the RMSI is obtained.

4. A base station, comprising:
a processor; and
a memory for storing processor executable instructions;
wherein the processor is configured to:
configure indication information for a common control resource set (CORESET) of remaining critical system information (RMSI) corresponding to a synchronous broadcast block (SSB), the indication information being configured to indicate that the base station has not transmitted a CORESET of the RMSI in a current transmission cycle of the SSB;
add the indication information to the SSB; and
transmit the SSB carrying the indication information to user equipment (UE) in a beam scanning manner;
wherein in configuring the indication information for the CORESET of the RMSI corresponding to the SSB, the processor is further configured to perform at least one of:
configuring a time-domain search window of the CORESET of the RMSI into an illegal time-frequency search window; or
configuring the indication information to a redundant code point of frequency offset information between the CORESET of the RMSI corresponding to the SSB and the SSB.

5. The base station according to claim 3, wherein the processor is configured to perform configuring the time-domain search window of the CORESET of the RMSI to the illegal time-frequency search window, and configuring the time-domain search window comprises:
configuring a time-domain starting search position of the CORESET of the RMSI to be a time-domain starting search position of the SSB.

6. User equipment comprising:
a processor; and
a memory for storing processor executable instructions;
wherein the processor is configured to:
- receive a synchronous broadcast block (SSB) which carries indication information, and is transmitted by a base station, the indication information being configured to indicate that the base station has not transmitted a common control resource set (CORESET) of remaining critical system information (RMSI) in a current transmission cycle of the SSB;
- resolve the indication information from the SSB; and
- in case that it is determined that the base station has not transmitted the CORESET of the RMSI in the current transmission cycle of the SSB based on the indication information, resolve a position of the CORESET of the RMSI from a next SSB when the next SSB is received; and in case that the position of the CORESET of the RMSI is not obtained, repeatedly perform resolving the position of the CORESET of the RMSI from the next SSB when the next SSB is received, until the CORESET of the RMSI is obtained.

\* \* \* \* \*